Oct. 7, 1924.
M. SCHANG
1,510,611
PIPE CUTTER
Filed Dec. 5, 1921
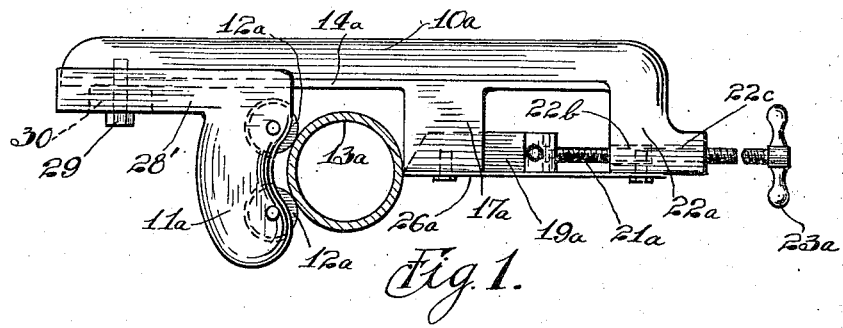
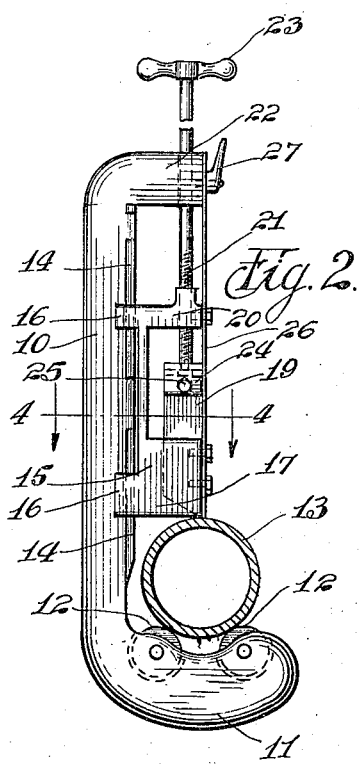
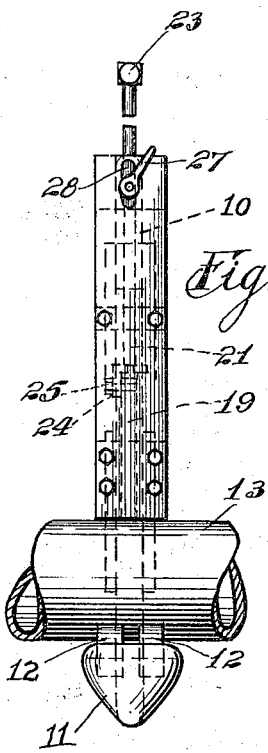
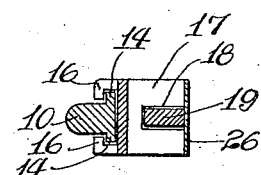
INVENTOR.
MICHAEL SCHANG.
BY Albert C. Bee
ATTORNEY.

Patented Oct. 7, 1924.

1,510,611

UNITED STATES PATENT OFFICE.

MICHAEL SCHANG, OF CHICAGO, ILLINOIS.

PIPE CUTTER.

Application filed December 5, 1921. Serial No. 519,845.

*To all whom it may concern:*

Be it known that I, MICHAEL SCHANG, a citizen of the United States, residing at Chicago, in the county of Cook and State of Illinois, have invented a new and useful Improvement in Pipe Cutters, of which the following is a specification.

My invention relates to an improved construction of pipe cutter by which the rotary cutting wheel commonly used heretofore is replaced by cutting mechanism movable toward the pipe as the cutting operation progresses, this mechanism being constructed so that the metal of the pipe is cut away and removed from the pipe as the tool is rotated around the pipe instead of being separated and forced or squeezed out laterally of the cutter without removal as is the case with the ordinary cutting wheel. My invention is particularly applicable to pipe cutters for hand operation which are readily portable as distinguished from power machines used for this purpose and my improved device includes all of the advantages of the well known portable pipe cutter and at the same time all of the advantages of the power cutter without however resulting in a complicated or expensive portable pipe cutter for general use by pipe fitters.

By my invention I provide a frame for holding guide rollers and on the frame I provide a cutter holder for receiving a cutting blade or cut-off tool arranged for movement by the operating handle of the device. Means are provided for holding the pipe positively against the guide rollers during the cutting operation so that the cut-off tool may be fed into the pipe as the tool is rotated around the pipe and cut a narrow ring of metal from the pipe so as to sever it into two parts. In this way the labor of cutting the pipe is very much reduced and the ends of the pipe are left in much better condition for subsequent operation than is possible where cutting wheels are employed.

My invention will best be understood by reference to the accompanying drawings, showing a preferred embodiment thereof in which—

Fig. 1 shows one form of my device in side elevation,

Fig. 2 shows in a view similar to Fig. 1 a different and preferred construction of my device, Fig. 3 shows in front elevation the construction shown in Fig. 2, and Fig. 4 is a sectional view of the parts shown in Fig. 2 taken along the line 4—4.

Similar numerals refer to similar parts throughout the several views.

As shown in Figs. 2 and 3 my improved pipe cutter consists of a frame member 10 the lower end 11 of which extends substantially at right angles to the body portion thereof and has pivotally mounted on its inner portion two guide rollers 12, 12 for receiving between them the pipe 13 to be cut. The rollers 12, 12 are preferably mounted so that their axes are in a plane substantially perpendicular to the length of the body portion of the frame member 10. The inner edge of the frame member 10 is provided with opposite outwardly extending flanges 14, 14 forming guides for a slide 15 having hook shaped projections 16, 16 extending around said flanges as more clearly shown in Fig. 4. The slide 15 is enlarged at its lower end at 17 and has formed therein a slot 18 extending substantially parallel with the member 10 to receive with a sliding fit a cutting bar 19, preferably of rectangular cross-section, the lower end of which is sharpened to properly engage the pipe 13 to be cut. The right hand edge of the cutter bar as shown in Fig. 2, is preferably in a line passing substantially through the center line of the pipe 13 to be cut. The upper end of the slide 15 is provided with a projecting arm 20 having a threaded opening formed vertically therethrough for receiving the threaded rod 21, the upper end of which rod passes with a sliding fit through a clearance opening therefor in an arm 22 projecting from the upper portion of the frame member 10. The outer end of the rod 21 has an operating handle 23 rigidly secured thereto by which the rod may be turned in the arm 20 and the tool as a whole may be turned around the pipe to be cut. The lower end of the rod 21 is preferably provided with a groove for receiving the angle clip 24 secured to the cutter bar 19 by a screw 25 so that the end of the rod 21 rests against the end of the cutter bar 19. A cover plate 26 is secured to the outer surface of the enlarged portion 17 and the outer end of the arm 20 by suitable screws as indicated, to hold the cutter bar 19 in place in the slot 18 and this cover plate is extended upwardly and over the end surface of the arm 22 to which it is secured by a clamping nut or screw 27, a suitable slot 28 being provided through said cover plate to permit adjustment thereof and therefore adjustment of the slide 15 on the frame member 10.

In using the pipe cutter described the rod 21 is turned to draw the cutter bar 19 upwardly in the portion 17 until the cutting edge is just above the lower edge of the slide 15. The clamping device 27 is then released, the pipe 13 is placed on the rollers 12, 12 and the slide 15 is moved toward the pipe until it is in engagement therewith for which position the clamping device 27 is tightened and holds the parts in the relation described. The handle 23 is then turned to move the cutter bar 19 into engagement with the surface of the pipe and the pipe cutter is turned as a whole around the pipe repeatedly and during this operation from time to time the rod 21 is turned somewhat to correspondingly feed the cutter bar 19 into the pipe and in this manner the pipe is cut into two pieces. It will be understood that the rod 21 may be of sufficient diameter and strength to readily withstand any strain upon it when the handle 23 is used as a means for communicating to the tool the necessary effort to rotate the tool around the pipe and furthermore that the pitch of the thread on the rod 21 may be such as to permit the feeding of the cutting bar without the exertion of undue effort on the handle 23. The flanges 14 are interrupted at suitable places as indicated in Fig. 2 to permit assembling the slide on the frame portion of the tool and to remove the same when it is necessary to make repairs. The cutting operation described it will be noted, is radically different from that produced with the ordinary V-shaped cutting roller since the latter does not remove any metal from the pipe but merely severs it and forces it out to either side as the wheel is moved around the pipe and in this way produces outstanding ridges on the ends of the cut pipe which subsequently interfere with the threading operations. With my construction on the other hand these ridges are avoided and since the cutting operation actually removes the metal of the cut from the pipe and it is not necessary to force it into the adjacent parts of the pipe, the cuting operation may be much more easily performed besides leaving the ends of the pipe in a better condition than would otherwise be the case.

In the modified construction shown in Fig. 1 the frame member $10^a$ has two arms $17^a$ and $22^a$ extending therefrom and forming a rigid part thereof. The end portion of the frame member is provided with flanges $14^a$ forming a guide for a slide 28′ from which an arm $11^a$ projects at substantially right angles to support the guide rollers $12^a$, $12^a$. A clamping screw 29 is provided extending through a slot 30 in the slide 28 to hold the slide and guide rollers in any desired portion on the frame member $10^a$. The cutter bar $19^a$ is mounted in a slot in the arm $17^a$ and connected with the threaded rod $21^a$ in the manner above described, the cutter bar being held in the slot in the arm $17^a$ by a cover plate $26^a$ by suitable screws as indicated. The threaded portion of the rod $21^a$ passes through the arm $22^a$ and engages similar threads in the said arm which however extend preferably but a part of the distance through the arm $22^a$ as indicated at $22^b$, the remaining portion of the hole for the threaded rod $21^a$ being preferably a sliding fit on the screw as indicated at $22^c$. The rod $21^a$ is provided with an operating handle $23^a$ in substantially the manner above described. The relation between the cutting edge of the cutter bar $19^a$ and the rollers $12^a$—$12^a$ is substantially the same as described for the similar parts in connection with Figs. 2 and 3.

In using the construction shown in Fig. 1 the cutter bar $19^a$ is moved by means of the rod $21^a$ so that the cutting edge thereof is contained with the slot formed in the arm $17^a$ to receive the cutter bar. The screw 29 is then released and the slide 28 is moved away from the arm $17^a$ to permit the pipe $13^a$ to be placed on the guide rollers $12^a$ for which condition the slide 28 is moved toward the arm $17^a$ until the guide rollers and the edge of the arm $17^a$ engage the pipe in which position the slide 28 is clamped by means of the screw 29. The handle $23^a$ is then turned to move the cutter bar into engagement with the pipe and the tool as a whole is rotated around the pipe to cut the same in substantially the manner above described.

While I have shown my invention in the particular embodiments above described, it will be understood that I do not limit myself to this exact construction as I may employ equivalents known to the art at the time of the filling of this application without departing from the scope of the appended claims.

What I claim is:

1. In a pipe cutter, the combination of a frame having a substantially straight body portion and end arms projecting in the same direction, guide rollers carried by the inner portion of one of said arms for engaging a pipe to be cut, the other of said arms having a hole therethrough for receiving an operating rod, opposite flanges projecting from said body portions, a slide having hook shaped guide ways engaging said flanges, a cutter bar carried by said slide and movable towards and away from said rollers, a threaded operating rod engaging said cutter bar to feed the latter, said cutter bar being of rectangular cross section and contained in a slot of similar cross section in said slide, and a cover plate for holding said cutter bar in said slot, said rod being in threaded engagement with said slide.

2. In a pipe cutter, the combination of a frame comprising a body portion and an arm projecting therefrom to support a pipe to be cut, a slide mounted for movement on said body portion towards and away from said arm, a cutter bar, said slide being slotted to receive and permit sliding movement therein of said cutter bar, a threaded rod engaging said slide and said cutter bar to feed the latter, a retaining plate, and devices removably securing said plate to said body portion and to said slide to prevent motion of said slide and to enclose said cutter bar slot and permit sliding movement of said cutter bar therein.

3. In a pipe cutter, the combination of a frame comprising a body portion and an arm projecting therefrom to support a pipe to be cut, a slide mounted for movement on said body portion towards and away from said arm, a cutter bar, said slide being slotted to receive and permit sliding movement therein of said cutter bar, a threaded rod engaging said slide and said cutter bar to feed the latter, a retaining plate, devices removably securing said plate to said body portion and to said slide to prevent motion of said slide and to enclose said cutter bar slot and permit sliding movement of said cutter bar therein, and angularly spaced rollers carried by said arm for preventing displacement of said pipe during cutting, said plate being slotted at one end and one of said devices comprising a thumb screw extending through the slot in said plate to facilitate setting said slide in desired position on said body portion.

4. In a pipe cutter, the combination of a frame comprising a body portion and an arm projecting therefrom to support a pipe to be cut, a slide mounted for movement on said body portion towards and away from said arm, a cutter bar, said cutter bar being movable longitudinally relatively to said slide, a threaded rod for feeding said cutter bar, a retaining plate connecting said slide and said frame and permitting movement of said slide relatively to said frame, and devices for rigidly securing said retaining plate to said slide and said frame for a desired position of said slide on said frame.

In witness whereof, I hereunto subscribe my name this 28th day of November, A. D. 1921.

MICHAEL SCHANG.